(12) United States Patent
Maruyama et al.

(10) Patent No.: US 7,663,863 B2
(45) Date of Patent: Feb. 16, 2010

(54) ELECTRODE FOR CAPACITOR AND ELECTRIC DOUBLE LAYER CAPACITOR USING THE SAME

(75) Inventors: Tsukasa Maruyama, Hiratsuka (JP); Ayumu Kamakura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 154 days.

(21) Appl. No.: 11/943,061

(22) Filed: Nov. 20, 2007

(65) Prior Publication Data
US 2008/0117562 A1    May 22, 2008

(30) Foreign Application Priority Data

Nov. 21, 2006  (JP)  ............................. 2006-314490
Aug. 14, 2007  (JP)  ............................. 2007-211404

(51) Int. Cl.
*H01G 9/00*    (2006.01)
(52) U.S. Cl. ..................... 361/502; 361/503; 29/25.03
(58) Field of Classification Search ................ 361/502, 361/503; 29/25.03
See application file for complete search history.

(56) References Cited

U.S. PATENT DOCUMENTS

| 5,646,815 | A | * | 7/1997 | Owens et al. | ............... | 361/502 |
| 5,907,472 | A | * | 5/1999 | Farahmandi et al. | ........ | 361/502 |
| 5,956,225 | A | * | 9/1999 | Okuyama et al. | .......... | 361/502 |
| 7,351,359 | B2 | | 4/2008 | Maruyama et al. | | |

FOREIGN PATENT DOCUMENTS

| DE | 11 2004 001 461 T5 | 8/2006 |
| JP | 6-196152 | 7/1994 |
| JP | 07-201676 | 8/1995 |
| JP | 2000-082467 | 3/2000 |
| JP | 2002-025865 | 1/2002 |
| JP | 2002-025868 | 1/2002 |
| JP | 2003-017370 | 1/2003 |
| JP | 2004-193443 | 7/2004 |
| JP | 2005-330624 | 12/2005 |
| JP | 2006-216562 | 8/2006 |
| JP | 2006-331790 | 12/2006 |
| KR | 20040083573 A | 10/2004 |
| WO | WO-2005/035626 | 4/2005 |

OTHER PUBLICATIONS

C. Kim, K. S. Yang, Electrochemical properties of carbon nanofiber web as an electrode for supercapacitor prepared by electrospinning, Applied Physics Letters, Aug. 11, 2003, vol. 83 No. 6, pp. 1216-1218.
Office Action in German Patent Application No. 10 2007 055 283.3, dated Nov. 3, 2009.

* cited by examiner

*Primary Examiner*—Eric Thomas
(74) *Attorney, Agent, or Firm*—Connolly Bove Lodge & Hutz LLP

(57) ABSTRACT

An electrode for an electric double layer capacitor including a current collector electrode and an active substance carried on the current collector electrode, wherein the active substance is composed of a carbon-based fiber and a conductive polymer fiber formed by the electrospinning method, whereby a high capacity capacitor electrode having of a larger specific surface area than a conventional capacitor electrode and an electric double layer capacitor using the same is provided.

19 Claims, 1 Drawing Sheet

ELECTRODE FOR CAPACITOR AND ELECTRIC DOUBLE LAYER CAPACITOR USING THE SAME

TECHNICAL FIELD

The present invention relates to an electrode for a capacitor and an electric double layer capacitor using the same as a polarizable electrode. More specifically, it relates to an electrode for a high capacity type capacitor having a larger specific surface area than a conventional electrode for a capacitor and an electric double layer capacitor using the same as a polarizable electrode.

BACKGROUND ART

The activated carbon used for an electrode application in an electric double layer capacitor is produced by carbonizing, granulating and activating a material composed of carbon. The activated carbon has an extremely large number of pores. By forming an electrical double layer at the surface of these pores, electric power can be stored. However, an electric double layer capacitor has a smaller discharge capacity compared with a secondary battery. A further increase in the discharge capacity of electric double layer capacitors is therefore being needed. To increase the storage capacity density of an electric double layer capacitor using an activated carbon electrode, attempts have been made to increase the specific surface area of the activated carbon (i.e., a surface area per unit weight), but since the bulk density is reduced, it is difficult to increase the specific surface area over that of current products to increase the storage capacity density.

To solve the above problem, attempts have been made to utilize carbon nanofibers as the carbon material for the electrode material (see, for example, Patent Document 1). Carbon nanofibers form a network structure, and therefore the holes in the network act as pseudo pores and are effective for obtaining a large capacity, but these are bulky, and therefore, the electrode density is decreased and the capacity per volume is decreased. Further, carbon nanofibers are expensive, and therefore, an increase in cost of the electrodes is incurred. Further, attempts are made to use conductive polymer/porous carbon composites of activated carbon or another porous carbon material and a conductive polymer as an electrode to increase the storage capacity density of an electric double layer capacitor.

Patent Document 2 and Patent Document 3 propose preparing a conductive polymer/porous carbon composite by the electrolytic polymerization method and using it as the polarizable electrode of an electric double layer capacitor and use a polyaniline/porous carbon composite as the electrode. According to these Patent Documents, there are the advantages that the specific electrostatic capacity is larger than the case of use of a conventional polarizable electrode and the internal resistance also becomes smaller. However, the electrolytic polymerization method has the problem that the area of the resultant electrode is limited, and therefore, polymerization over a large area is difficult and not practical. Further, Patent Document 4 proposes to chemically polymerize aniline in an aqueous solution in the presence of a porous carbon material to obtain a polyaniline/porous carbon composite and to use this as a polarizable electrode, but there is the problem that the resultant polyaniline/porous carbon composite has to be rinsed, and therefore, the operation becomes complicated. Further, Patent Document 5 proposes to mix an aqueous polyaniline sulfonic acid solution and porous carbon material, then distill off the water in vacuo to obtain a polyaniline/porous carbon composite and to use this as a polarizable electrode, but a polyaniline sulfonic acids is water soluble, and therefore, in a water-based electrolytic solution, the electrode would easily leach the polyaniline sulfonic acid, while in an organic solvent-based electrolytic solution, the affinity of the electrode with the electrolytic solution would be low and, furthermore, the water used at the time of production could not be completely removed from the electrode, and therefore, an electric double layer capacitor using an organic solvent-based electrolytic solution would have the problem of an inferior long term stability. Further, a polyaniline sulfonic acids have a sulfonic acid group at the side chain thereof, and therefore, there is also the problem that the withstand voltage of the electrode will becomes lower depending on the selected electrolytic solution.

Patent Document 6 proposes a battery electrode composed of polypyrrole, polypyridine, or another π-conjugated polymer including a nitrogen atom and a carbon material or other conductive aids. However, the battery electrode described in Patent Document 6 is a secondary battery electrode, the weight ratio of the π-conjugated polymer and a conductive aid is 70:30 to 97:3, and the main substance is the π-conjugated polymer. Further, since the main component substance of the electrode agent is a π-conjugated polymer, when making the film thickness of the electrode 50 μm or more, there is also the problem that cracks etc. occur on the electrode surface and the electrode will not sufficiently function. Further, when using polypyridine or another π-conjugated polymer including a nitrogen atom together with a carbon material and the content of the carbon material is greater than that of the π-conjugated polymer, it will function in the same way as the polyaniline as a capacitor electrode material. By the combined use with a π-conjugated polymer, the electrostatic capacity was improved, compared with an electrode composed of only a carbon material, but it was not necessarily satisfactory.

Patent Document 7 discloses a method for producing a vinyl-based conductive polymer fiber by the electrospinning method, but has no description relating to an electrode material for a capacitor. Further, a polyparaphenylene vinylene or other vinyl-based conductive polymer has a lower conductivity than other π-conjugated polymers and is insufficient in performance as an electrode material for a capacitor. Patent Document 8 discloses a solar battery electrode formed from a mixture of a conductive polymer and a carbon nanotube by the electrospinning method, but no detailed and specific examples relating to a conductive polymer and a carbon nanotube are shown. Patent Document 9 also discloses a solar battery electrode obtained by the electrospinning method, but this is an electrode composed of only a carbon material.

Patent Document 1: Japanese Patent Publication (A) No. 2004-193443

Patent Document 2: Japanese Patent Publication (A) No. 7-201676

Patent Document 3: Japanese Patent Publication (A) No. 2002-25868

Patent Document 4: Japanese Patent Publication (A) No. 2002-25865

Patent Document 5: Japanese Patent Publication (A) No. 2003-17370

Patent Document 6: Japanese Patent Publication (A) No. 2000-82467

Patent Document 7: Japanese Patent Publication (A) No. 2005-330624

Patent Document 8: Japanese Patent Publication (A) No. 2006-216562

Patent Document 9: Japanese Patent Publication (A) No. 2006-331790

SUMMARY OF THE INVENTION

Accordingly, an object of the present invention is to obtain an electrode for a large discharge capacity electric double layer capacitor having a larger specific surface area than a conventional capacitor use electrode and an electric double layer capacitor using the same as a polarizable electrode.

In accordance with the present invention, there is provided an electrode comprising a current collector electrode on the surface of which a conductive polymer fiber and a carbon-based fiber are formed by an electrospinning method.

A conventional capacitor electrode is formed by mixing and dispersing a carbon-based powder and a conductive polymer powder, then press molding the mixture or is formed by mixing and dispersing a carbon-based powder and a conductive polymer powder in a solvent, then coating the dispersion on a current collector electrode. As opposed to this, according to the present invention, the electrospinning method may be used, whereby the carbon-based fiber and the conductive polymer fiber having a diameter of 1 μm or less, can be produced, and therefore, it is possible to obtain a high capacity capacitor electrode having a larger specific surface area than a conventional electrode.

BEST MODE FOR CARRYING OUT THE INVENTION

Figure 1:
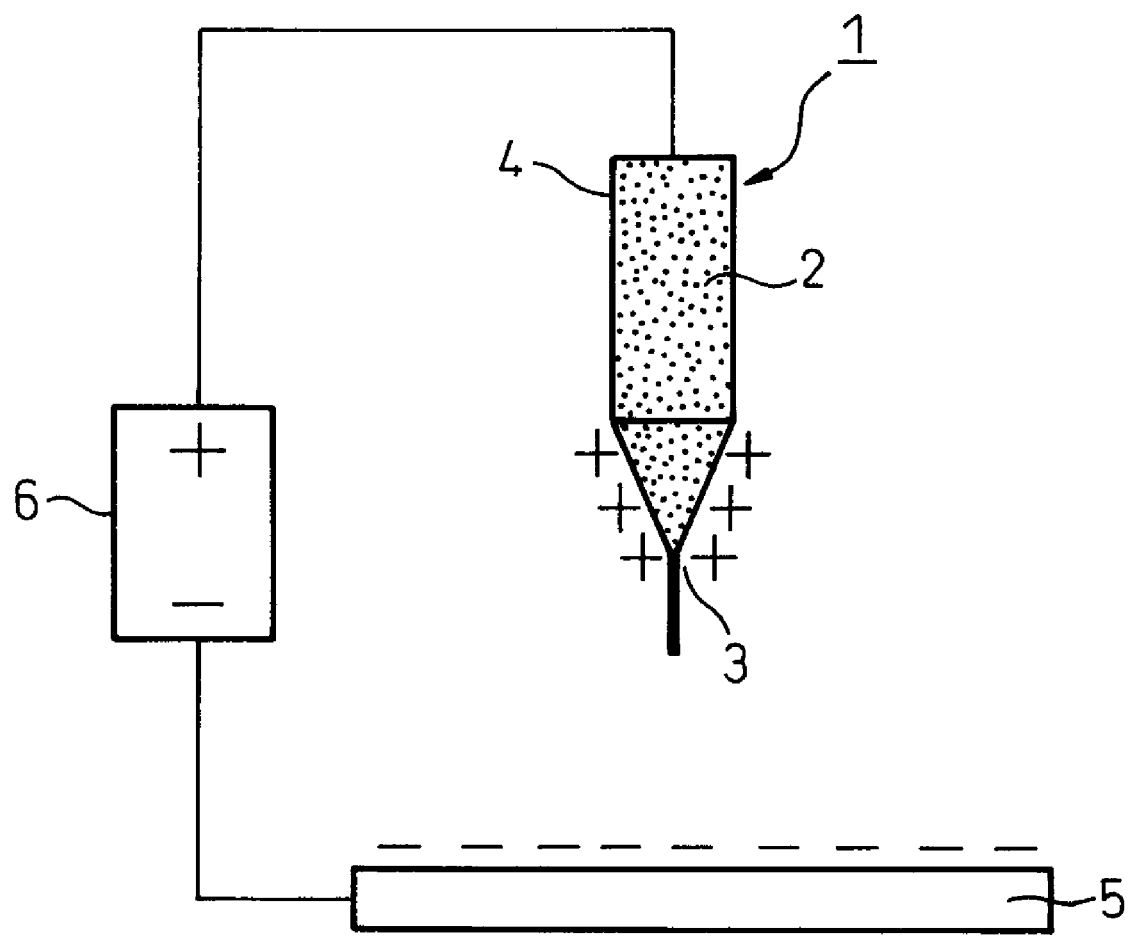
FIG. 1 is a schematic view for explaining the principle of the electrospinning method used in the present invention.

As used in the specification and the appended claims, the singular forms (e.g., "a", "an" and "the") include their plural referents unless the context clearly dictates otherwise.

The present inventors engaged in research to solve the above-mentioned problems and, as a result, succeeded in achieving the above object by using the electrospinning method to form a net-shaped thin film composed of a conductive polymer fiber and a carbon-based fiber on the surface of a current collector electrode.

The substrate of the current collector electrode forming the electrode of the present invention is not particularly limited so long as the current collector used for the electric double layer capacitor of the present invention as in the past has electrochemical and chemical corrosion resistance, but, for example, stainless steel, aluminum, nickel, copper, titanium, tantalum or other metal alone or an alloy of these metals, carbon-covered aluminum or other carbon covered member, conductive ceramic, conductive rubber, conductive resin, etc. may be mentioned. This is suitably selected from the foil, expand metal or other conditions of use of the capacitor and the environment. According to the present invention, as explained below, the carbon-based fiber and the conductive polymer fiber are laminated over the surface of a current collector electrode using the electrospinning method.

The carbon-based fiber used in the present invention may be formed from a dispersion of activated carbon or other porous carbon material dispersed in water and/or an organic solvent, in the form of a dispersion or slurry, using the electrospinning method. The porous carbon material is not particularly limited, but a powdered, granular or fibrous carbon having a specific surface area of 100 $m^2/g$ or more ("specific surface area" means a BET specific surface area determined by a nitrogen adsorption isotherm) is preferable. This porous carbon material is known. Carbon black (e.g., acetylene black, furnace black, etc.), activated carbon, etc. may be mentioned. For example, Ketjen Black EC300J and Ketjen Black EC600JD made by Lion Corporation and Fine Activated Carbon RP and Fine Activated Carbon YP made by Kurarey Chemical are available. Further, as the porous carbon material, carbon nanofibers or other carbon fibers may be used together. Vapor phase carbon fiber (tradename VGCF) made by Showa Denko K.K., carbon nanotubes made by GSI Creos (tradename Carbere), etc. may be exemplified.

On the other hand, the conductor polymer forming the conductive polymer fiber used together with the carbon-based fiber in the present invention is not particularly limited so long as it is a conductive polymer containing a nitrogen atom, for example, polyaniline, polypyrrole, polyindole, polyquinoline, polypyridine, polyquinoxaline or their derivatives (e.g., having an alkyl group, alkoxy group, alkoxyalkyl group, aryl group, etc. at the side chain) may be mentioned. These are polymers of known compounds and can be produced by the method explained later. The molecular weight of the resultant polymer is not particularly limited, but preferably the weight average molecular weight is 1,000 to 100,000 or so.

Explaining the production of the polyaniline, it is produced by oxidative polymerization of aniline or its derivatives with a sulfonic acid in a mixed layer composed of an aqueous layer and an organic layer in the presence of a molecular weight adjuster and, optionally, an interphase transfer catalyst. Note that, at the time of the oxidative polymerization, other general use additives may be used as in the past so long as not detracting from the object of the present invention.

As the aniline derivatives, aniline derivatives having at least one of an alkyl group, alkenyl group, alkoxy group, alkylthio group, aryl group, aryloxy group, alkylaryl group, arylalkyl group or alkoxyalkyl group as a substituent group at positions other the 4th position of the aniline may be mentioned. Preferably, an aniline derivative having at least one $C_1$ to $C_5$ alkyl group, alkoxy group or alkoxyalkyl group, a $C_6$ to $C_{10}$ aryl group, as a substituent group may be mentioned.

The oxidizing agent for the oxidative polymerization of the aniline is not particularly limited so long as it can polymerize said aniline or its derivatives. For example, ammonium persulfate, persulfate, sodium persulfate, potassium persulfate or other persulfates, hydrogen peroxide, ferric chloride, ferric sulfate, potassium bichromate, potassium permanganate, hydrogen peroxide-ferrous salt and other redox initiators etc. are preferably used. These oxidizing agents may be used alone or may be used in any combination of two or more types. The amount of these oxidizing agents used is not particularly limited so long as it is an amount enabling oxidative polymerization of the aniline or its derivatives, but is preferably 0.01 to 10 moles, more preferably 0.1 to 5 moles, based upon 1 mole of aniline or its derivatives.

In the present invention, at the time of oxidative polymerization of aniline or its derivatives and sulfonic acid, a molecular weight adjuster and, optionally, an interphase transfer catalyst are made copresent and the polymerization conducted in a mixed layer of an aqueous layer and an organic layer.

As the sulfonic acid usable in the present invention, any sulfonic acid usable for oxidative polymerization of aniline from the past may be used. Specifically, an aliphatic or aromatic sulfonic acid having one or more sulfonic acid groups and their salts such as an alkyl sulfonic acid, aryl sulfonic acid, alkylaryl sulfonic acid, α-olefin sulfonic acid, higher fatty acid ester sulfonic acid, (di)alkyl sulfosuccinic acid, higher aliphatic amide sulfonic acid, camphor sulfonic acid, and their salts may be mentioned. The amount of these sulfonic acids used is not particularly limited, but is preferably 0.01 to 5 moles more preferably 0.1 to 3 moles, per 1 mole of aniline or its derivatives. At the time of the polymerization, in addition to a sulfonic acid, hydrochloric acid, sulfuric acid, nitric acid, perchloric acid and other inorganic acids, m-nitrobenzoic acid, trichloroacetic acid and other organic acids and other protonic acids may also be optionally added.

As the molecular weight adjuster used in the present invention, an aniline derivative having a substituent group at its 4th position, a thiol compound, disulfide compound and/or α-methylstyrene dimer may be mentioned.

As the aniline derivative having a substituent group X at its 4th position, compounds having the formula (I) may be mentioned:

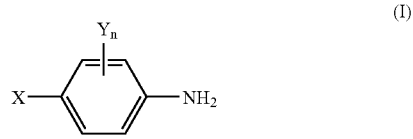

(I)

In formula (I), X indicates an alkyl group preferably having 1 to 8 carbon atoms, an alkenyl group preferably having 1 to 8 carbon atoms, an alkoxyl group preferably having 1 to 8 carbon atoms, an alkylthio group preferably having 1 to 8 carbon atoms, an aryl group preferably having 6 to 12 carbon atoms, an aryloxy group preferably having 6 to 12 carbon atoms, an alkylaryl group preferably having 7 to 17 carbon atoms, an arylalkyl group preferably having 7 to 17 carbon atoms, an alkoxyalkyl group preferably having 2 to 10 carbon atoms or halogen atom (e.g., F, Cl, Br, I), Y indicates a hydrogen atom, an alkyl group preferably having 1 to 5 carbon atoms, an alkenyl group preferably having 1 to 5 carbon atoms, an alkoxyl group preferably having 1 to 5 carbon atoms, an alkylthio group preferably having 1 to 5 carbon atoms, an aryl group preferably having 6 to 12 carbon atoms, an aryloxy group preferably having 6 to 12 carbon atoms, an alkylaryl group preferably having 7 to 17 carbon atoms, an arylalkyl group preferably having 7 to 17 carbon atoms, an alkoxyalkyl group preferably having 6 to 12 carbon atoms or halogen atom (e.g., F, Cl, Br, I), and n indicates an integer of 0 to 4, where when n is an integer of 2 to 4, Y may be the same or different. A preferable substituent group X is a $C_1$ to $C_5$ alkyl group, a $C_1$ to $C_5$ alkoxy group, a $C_2$ to $C_5$ alkoxyalkyl group, a $C_6$ to $C_{10}$ aryl group, while a preferable substituent group Y is a hydrogen atom, $C_1$ to $C_5$ alkyl group, a $C_1$ to $C_5$ alkoxy group, a $C_2$ to $C_5$ alkoxyalkyl group, a $C_6$ to $C_{10}$ aryl group.

As the thiol compound and/or disulfide compound usable in the present invention, butyl mercaptan, octyl mercaptan, dodecyl mercaptan, hexadecyl mercaptan, tetradecyl mercaptan, 2,2,4,6,6-pentamethyl heptane-4-methylene thiol or other thiol compounds, diethyl disulfide, dibutyl disulfide or other alkyl disulfides, diphenyl disulfide, dibenzyl disulfide or other aromatic disulfides, dimethyl xantogen disulfide, diethyl xantogen disulfide or other xantogen disulfides, tetramethyl thiuram disulfide, tetraethyl thiuram disulfide or other thiuram disulfides or other disulfide compounds may be mentioned. These are known compounds. Many are generally commercially available. The amount of the molecular weight adjuster used is not particularly limited, but is preferably $5.0 \times 10^{-5}$ to $5.0 \times 10^{-1}$ moles, more preferably $2.0 \times 10^{-4}$ to $2.0 \times 10^{-1}$ moles, based upon 1 mole of aniline or its derivatives.

In the present invention, the interphase transfer catalyst optionally used is not particularly limited so long as it is one which is generally used as an interphase transfer catalyst, but specifically benzyltriethyl ammonium chloride, methyltrioctyl ammonium chloride, tetra-n-butyl ammonium bromide, tetra-n-butyl ammonium iodide, tetra-n-butyl ammonium chloride and other tetraalkyl ammonium halides; tetrabutyl ammonium hydroxide and other tetraalkyl ammonium hydroxides; methyltriphenyl phosphonium bromide and other tetraalkyl phosphonium halides; 12-crown-4, 15-crown-S, 18-crown-6 and other crown ethers etc. may be mentioned. Among these, from the viewpoint of the removal of the catalyst after the reaction and other ease of handling, tetraalkyl ammonium halides are preferable. In particular, tetra-n-butyl ammonium bromide or tetra-n-butyl ammonium chloride able to be obtained particularly inexpensively industrially is preferable. In the present invention, the amount of the interphase transfer catalyst optionally used is not particularly limited, but is preferably 0.0001 molar times equivalent or more, more preferably 0.005 molar times equivalent or more, based upon to the oxidizing agent. If the interphase transfer catalyst is used in excess, the separation and refinement process after the end of the reaction becomes difficult, so when used, it is preferably used in 5 molar times equivalents or less, more preferably an equal times molar amount.

The polymerization catalyst of the present invention uses a mixed layer of water and an organic solvent as a solvent. The organic solvent is not particularly limited so long as it can dissolve aniline or its derivatives and is non water soluble. As specific examples, benzene, toluene, xylene or other aromatic hydrocarbons; hexane, heptane, octane and other aliphatic hydrocarbons; dichloroethane, chloroform, 1,2-dichloroethane, chlorobenzene, dichlorobenzene or other halogenated hydrocarbons; diethyl ether, di-n-propyl ether, diisopropyl ether, di-n-butyl ether, tert-butylmethyl ether or other ethers; ethyl acetate, n-propyl acetate, isopropyl acetate, n-butyl acetate or other esters may be mentioned. Among these, aromatic hydrocarbons, aliphatic hydrocarbons and halogenated hydrocarbons are preferable. The inexpensive, low toxicity toluene and xylene are particularly preferable. The organic solvent may be used alone or in any combination of two or more types mixed together. The amount of the liquid solvent used may be the stirrable amount. Usually, it is used in an amount of 1 to 500 parts times by weight, preferably 2 to 300 parts times by weight, based upon the aniline or its derivatives. Here, the amount of the organic solvent used is 0.05 to 30 parts times by weight, preferably 0.1 to 10 parts times by weight, based upon the water.

The reaction temperature is not particularly limited, but is preferably −10° C. to 80° C. The polyaniline oxidatively polymerized according to the present invention is extremely high in yield. Usually, it is 80% or more. Further, the electrical conductivity is $10^{-1}$ Scm$^{-1}$ or more.

Polyaniline or its derivatives (hereinafter simply referred to as "polyaniline") stably dispersed in the organic solvent of the present invention may be separated by the following procedures:

(a) The method of separating the polyaniline by removing the organic solvent from the resultant reaction solution by evaporation etc. to make the polyaniline precipitate, then removing the water, (b) The method of separating polyaniline dispersed in an organic solvent by adding water and/or a polar organic solvent to the resultant reaction solution and removing only the aqueous layer from the reaction solution separated into the organic layer and aqueous layer, (c) The method of separating polyaniline by adding a polar organic solvent in an excess to the resultant reaction solution to make the polyaniline precipitate, then using filtration or decantation etc. to remove the solvent.

Among these, the preferable separation methods are the methods of (a) and (b), and the more preferable one is the method of (b).

Further, the polyaniline dispersion may be prepared by the following operation in addition to the above method (b).

(d) The method of dispersing the polyaniline separated by (a) or (c) in the organic solvent used when oxidatively polymerizing the aniline or aniline derivative.

(e) The method of adding to the polyaniline dispersion prepared by the method (b) the organic solvent used when preparing the dispersion and/or an organic solvent compatible with this organic solvent.

When preparing said polyaniline dispersion, a sandmill, beads mill, ball mill, triple roll mill, colloid mill, ultrasonic homogenizer, Henschel mixer, jet mill or other disperser may be used.

The polyaniline formed by the above methods can be stably dispersed in an organic solvent in the conductive state. Therefore, the conductive polyaniline dispersion formed by this technique may be used as it is or the polyaniline produced by treatment of this dispersion by a known method to remove the dope may be used. Further, for the polyaniline, undoped state polyaniline produced by the method disclosed in Japanese Patent Publication (A) No. 3-52929 may also be used. When using such undoped state polyaniline, one dispersed or dissolved in N-methyl-2-pyrrolidone, N,N-dimethyl formamide or another aprotic polar solvent is preferably used. The polypyrrole is preferably one having at its side chain at least one of a $C_1$ or more alkyl group, a $C_1$ or more alkoxy group, a $C_2$ or more alkoxyalkyl group, a $C_6$ or more cyclohexyl group, $C_6$ or more aryl group, a $C_6$ or more alkylaryl group, etc. as a substituent group and can be produced by a known method (Ogata, Naoya ed., "Conductive Polymer", Kodansha Scientific, pp. 51 to 93). Further, polypyrrole dispersions are commercially available (made by Aldrich) and can be used as they are.

Polyindole and its derivatives can be produced by the methods disclosed in Japanese Patent Publication (A) No. 5-148320 and Japanese Patent Publication (A) No. 2001-342242.

Polyquinone, polypyridine and polyquinoxaline may be produced by the methods disclosed in, for example, Macromolecules, vol. 24, p. 5883, 1991, Macromolecules, vol. 27, p. 756, 1994, Journal of American Chemical Society, vol. 116, p. 4832, 1994, Journal of American Chemical Society, vol. 118, p. 3930, 1996.

According to the present invention, for example, it is possible to spin and laminate a dispersion composed activated carbon or another porous carbon material dispersed in water and/or an organic solvent in the state of a dispersion or slurry and the above-obtained dispersion of a conductive polymer on a current collector electrode substrate by the electrospinning method to, for example, form 0.01 to 300 µm thick fiber in a net shape, whereby the electrode for an electric double layer capacitor according to the present invention is obtained.

The electrospinning method usable in the present invention, as described in, for example, U.S. Pat. No. 1,975,504, "AN INTRODUCTION TO ELECTROSPINNING AND NANOFIBERS", Seeram Ramakrishna, Kazutoshi Fujihara, Wee-Eong Teo, Teik-Cheng Lim and Zuwei Ma, World Scientific (2005) etc., is known art. Specifically, as shown in FIG. 1, a conductive polymer/porous carbon material slurry obtained by converting a porous carbon material and conductive polymer to a slurry in a solvent is charged into an electrospinning apparatus 1 composed of a storage tank 2 and spinneret 3, voltage is applied from a power supply 6 between a plus electrode 4 contacting the slurry and a ground electrode (or a current collector electrode) 5, and the spinneret 3 ejects the slurry to laminate a net shaped (or random) fiber layer on the substrate surface of the ground electrode 5. The size of the spinneret 3 is not particularly limited, but to make the fiber diameter 1 µm or less, the inside diameter is preferably 10 µm to 5.0 mm and more preferably 50 µm to 2.0 mm. Further, the applied voltage is also not particularly limited, but to make the fiber diameter 1 µm or less, 0.1 to 40 kV is preferable and 0.5 to 25 kV is more preferable. The dimensions of the fiber obtained are also not particularly limited, but to make the electrostatic capacity of the electric double layer capacitor 100 F/g or more, a fiber diameter of 1 µm or less is preferable.

The concentration of the porous carbon material in the dispersion composed of water and/or an organic solvent, into which a porous carbon material is dispersed and the concentration of the conductive polymer in the conductive polymer dispersion are not particularly limited, but 1 to 50% by weight is preferable. For example, in the case of a polyaniline dispersion, from the viewpoint of the dispersion stability and the conductivity and strength of the polyaniline fiber formed from the dispersion, polyaniline in an amount of 1 to 90% by weight, sulfonic acid in 0 to 80% by weight, and a molecular weight adjuster in 0.01 to 20% by weight are preferable. Further, the viscosity of the dispersion composed of the porous carbon material and conductive polymer dispersed in water and/or an organic solvent is preferably 1 to 20,000 cps, more preferably 10 to 10,000 cps.

According to the present invention, a plus high voltage is applied to the slurry or dispersion. Due to this high voltage, the slurry or dispersion becomes a sharp conical shape. If the voltage is further increased, the slurry or dispersion starts to be sprayed toward the ground electrode. By connecting the current collector electrode to the ground, it is possible to form a laminate composed of nanofibers on its surface. The voltage is applied at a level of 10 kV to 20 kV, and the slurry or dispersion is sent from the storage tank to the spinneret by a certain speed. The polymer use medium evaporates before reaching the substrate, whereby the fiber is spun by the field effect between the spinneret and the current collector electrode and, depending on the conditions, becomes nanofibers. Since the solvent evaporates, it is possible to make the fibril surface porous.

According to the present invention, the electrode obtained as explained above can be used as a polarizable electrode of an electric double layer capacitor. The electrode according to the present invention has a network structure composed of a conductive polymer fiber and a carbon-based fiber. Therefore, since the electrode surface area can be increased, the internal resistance can be decreased, and the pores of the carbon-based material can be effectively utilized, the effects of the capacity increase per weight and per volume of the electric double layer capacitor and of the increase in speed of the large power charging/discharging can be obtained.

EXAMPLES

Examples of the present invention will now be described for illustrative purposes, but the scope of the present invention is, of course, by no means limited to these Examples.

Preparation of Polyaniline-Toluene Dispersion

To 100 g of toluene, 2 g of aniline, 4.2 g of dodecyl benzene sulfonic acid and 0.03 g of 4-methyl aniline were dissolved, then 50 g of distilled water, in which 3.58 ml of 6N hydrochloric acid was dissolved, was added. To this mixed solution, 180 mg of tetrabutyl ammonium bromide was added. The mixture was cooled to 5° C. or less, then 30 g of distilled water, in which 5.4 g of ammonium persulfate was dissolved, was added. The mixture was oxidatively polymerized in the state of 5° C. or less for 5 hours, then 50 g of toluene and then a methanol-water mixed solvent having a weight ratio of water/methanol=2/3 was added and then the mixture was stirred. After stirring, only the aqueous layer was removed from the reaction solution separated into an organic (i.e., toluene) layer and an aqueous layer to thereby obtain a polyaniline toluene dispersion. A part of the polyaniline toluene dispersion was taken and the toluene distilled off in vacuum, whereby it was found that the dispersion contained 3.4% by weight of a solid ingredient (a polyaniline content: 1.3% by weight). Further, the dispersion was filtered by a 1.0 μm pore size filter, whereupon it was found that there was no clogging and the dispersion was stable, without agglomeration or precipitation, even after 1 year at room temperature. From the elementary analysis, the ratio of the dodecyl benzene sulfonic acid to the aniline monomer unit was 0.45 and the yield of the resultant polyaniline was 96%.

Preparation of Polyaniline/Activated Carbon Slurry (Used in Examples 1 and 7)

To 100 g of a polyaniline toluene dispersion, 30.6 g of activated carbon powder having a specific surface area of 2000 m$^2$/g and an average particle size of 8 μm and 3.4 g of conductive carbon black (made by Lion, Ketjen Black ECP600JD) were added, then mixed using a ball mill to prepare a polyaniline/activated carbon slurry.

Preparation of Polypyrrole/Activated Carbon Slurry (Used in Example 2)

To 100 g of 5% by weight aqueous polypyrrole dispersion (made by Aldrich), 45 g of activated carbon powder having a specific surface area of 2000 m$^2$/g, and an average particle size of 8 μm and 5 g of conductive carbon black (made by Lion, Ketjen Black ECP600JD) were added, then mixed using a ball mill to prepare a polypyrrole/activated carbon slurry.

Preparation of Polyindole/Activated Carbon Slurry (Used in Example 3)

The method disclosed in Japanese Patent Publication (A) No. 5-148320 and Japanese Patent Publication (A) No. 2001-342242 was used to prepare polyindole-5-carboxylic acid. 5 g of the obtained polyindole-5-carboxylic acid was dissolved in 95 g of dimethyl formamide to prepare a 5% by weight polyindole solution. To 100 g of the resultant 5% by weight polyindole dimethyl formamide solution, 45 g of activated carbon powder having a specific surface area of 2000 m$^2$/g and an average particle size of 8 μm and 5 g of conductive carbon black (made by Lion, Ketjen Black ECP600JD) were mixed by a ball mill to prepare a polyindole/activated carbon slurry.

Preparation of Polyquinoline/Activated Carbon Slurry (Used in Example 4)

The method disclosed in Macromolecules, vol. 27, p. 756, 1994 was used to prepare poly(quinoline-2,6-diyl). 5 g of the resultant poly(quinoline-2,6-diyl) was dissolved in 95 g of formic acid to prepare a 5% by weight polyquinone solution. To 100 g of the resultant 5% by weight polyquinoline formic acid solution, 45 g of activated carbon powder having a specific surface area of 2000 m$^2$/g and an average particle size of 8 μm and 5 g of conductive carbon black (made by Lion, Ketjen Black ECP600JD) were added, then mixed using a ball mill to prepare a polyquinoline/activated carbon slurry.

Preparation of Polypyridine/Activated Carbon Slurry (Used in Example 5)

The method disclosed in the Journal of American Chemical Society, vol. 116, p. 4832, 1994 was used to prepare poly(pyridine-2,5-diyl). 5 g of the resultant poly(pyridine-2,5-diyl) was dissolved in 95 g of formic acid to prepare a 5% by weight polypyridine solution. To 100 g of the resultant 5% by weight polypyridine formic acid solution, 45 g of activated carbon powder having a specific surface area of 2000 m$^2$/g and an average particle size of 8 μm and 5 g of conductive carbon black (made by Lion, Ketjen Black ECP600JD) were added, then mixed using a ball mill to prepare a polypyridine/activated carbon slurry.

Preparation of Polyquinoxaline/Activated Carbon Slurry (Used in Example 6)

The method disclosed in the Journal of American Chemical Society, vol. 118, p. 3930, 1996 was used to prepare poly(quinoxaline-5,8-diyl). 5 g of the obtained poly(quinoxaline-5,8-diyl) was dissolved in 95 g of formic acid to prepare a 5% by weight polyquinoxaline solution. To 100 g of the resultant 5% by weight polyquinoxaline formic acid solution, 45 g of activated carbon powder having a specific surface area of 2000 m$^2$/g and an average particle size of 8 μm and 5 g of conductive carbon black (made by Lion, Ketjen Black ECP600JD) were added, then mixed using a ball mill to prepare a polyquinoxaline/activated carbon slurry.

Preparation of Activated Carbon Slurry (Used in Comparative Example 1)

80 parts by weight of activated carbon powder having a specific surface area of 2000 m$^2$/g and an average particle size of 8 μm, 10 parts by weight of conductive carbon black (made by Lion, Ketjen Black ECP600JD) and 10 parts by weight of polyvinylidene fluoride (made by Aldrich) were charged into a ball mill and mixed. To 100 parts by weight of the mixed powder, 400 parts by weight of N-methyl-2-pyrrolidone were added and mixed using a ball mill to prepare activated carbon slurry.

Then, an electrospinning apparatus as shown in FIG. 1 having a capacity of 50 ml, a spinneret size of 0.3 mm (inner diameter), a power supply of 18 kV, a size of a plus electrode deposited current collector electrode (material: aluminum) of 10×10 cm, and a distance from an ejection nozzle to current collector electrode of 15 cm was used to form a laminate composed of a conductive polymer fiber and a carbon-based fiber on a current collector electrode using the various types of activated carbon slurries shown in Table I, this was press formed at 15 MPa, and the product was used as an electrode for a capacitor. The weight of the laminate was about 2 g. The laminate composed of the conductive polymer fiber and the carbon-based fiber had a weight ratio of the conductive polymer fiber to the carbon-based fiber of 10% by weight.

The electrode used in Comparative Example 2 was prepared by mixing and dispersing 30.6 g of an activated carbon powder having a specific surface area of 2000 m$^2$/g and an average particle size of 8 μm, 100 g of polyaniline dispersion in toluene and 3.4 g of conductive carbon black (made by Lion, Ketjen Black ECP600JD), then distilling off the toluene in vacuo to obtain a polyaniline/activated carbon composite powder and taking 40 mg of this polyaniline/activated carbon composite powder, placing it in a mold having a diameter 10 mm, followed by press molding at 15 MPa.

The electrode used in Comparative Example 3 was prepared by mixing and dispersing 45 g of an activated carbon powder having a specific surface area of 2000 m$^2$/g and an average particle size of 8 μm, 100 g of polypyrrole dispersion and 5 g of conductive carbon black (made by Lion, Ketjen Black ECP600JD), followed by heat treating at 150° C. for 10 hours to obtain a polypyrrole/activated carbon composite powder and taking 40 mg of this polypyrrole/activated carbon composite powder, placing it in a mold of a diameter 10 mm, followed by press molding at 15 MPa.

The electrode used in Comparative Example 4 was prepared by the same method as Comparative Example 3, except that, instead of a polypyrrole dispersion, a 5% by weight polyindole dimethyl formamide solution (same as one prepared when preparing polyindole/activated carbon slurry) was used.

The electrode used in Comparative Example 5 was prepared by the same method as Comparative Example 3, except that, instead of a polypyrrole dispersion, a 5% by weight polyquinone formic acid solution (same as one prepared when preparing polyquinone/activated carbon slurry) was used.

The electrode used in Comparative Example 6 was prepared by the same method as Comparative Example 3, except that, instead of a polypyrrole dispersion, a 5% by weight polypyridine formic acid solution (same as one prepared when preparing polypyridine/activated carbon slurry) was used.

The electrode used in Comparative Example 7 was prepared by the same method as Comparative Example 3, except that, instead of a polypyrrole dispersion, a 5% by weight polyquinoxaline formic acid solution (same as one prepared when preparing polyquinoxaline/activated carbon slurry) was used.

Determination of Specific Capacity

In Examples 1 to 6 and Comparative Example 1, the following method was used to prepare electric double layer capacitors and determined the specific capacities for the electrode active substances.

An electrode comprised of a laminate formed by the electrospinning method and a current collector electrode was punched out to a 10 mm diameter to obtain an electrode (A). Further, 45 g of activated carbon powder having a specific surface area of 2000 $m^2/g$, and an average particle size of 8 μm, 5 g of conductive carbon black (made by Lion, Ketjen Black ECP600JD) and 5 g of polyvinylidene fluoride (made by Aldrich) were mixed using a ball mill, then 40 mg of the resultant mixed powder was taken, placed in a 10 mm diameter mold, followed by press forming at 15 MPa to an electrode used as the electrode (B). The electrodes (A) and (B) were dried at 100° C. in vacuo for 6 hours, then placed facing each other across a polypropylene separator having a thickness of 80 μm and impregnated in vacuo with a propylene carbonate solution of 1M tetraethyl ammonium tetrafluoroborate to fabricate an electric double layer capacitor. This electric double layer capacitor was measured for charging and discharging by a constant current of 300 mA/g per weight of electrode active substance using a charging/discharging tester (Hokuto Denko HJ1001SM8A). The specific capacity was determined from the discharge curve.

In Comparative Examples 2 to 7, the same method as in Comparative Example 1 was used to fabricate an electric double layer capacitor and determine the specific capacity per electrode active substance, except that, instead of the electrode formed by the electrospinning method, an electrode pressed formed into a shape having a 10 mm diameter was used as the electrode (A).

The obtained specific capacities are shown together in Table I.

TABLE I

|  | Example 1 | Example 2 | Example 3 | Example 4 |
|---|---|---|---|---|
| Conductive polymer | Polyaniline dispersion | Polypyrrole dispersion | Polyindole solution | Polyquinoline solution |
| Carbon | Activated carbon | Activated carbon | Activated carbon | Activated carbon |
| Electrode (A) preparation method | Electrospinning Mixed slurry of polyaniline and activated carbon sprayed on current collector electrode | Electrospinning Mixed slurry of polypyrrole and activated carbon sprayed on current collector electrode | Electrospinning Mixed slurry of polyindole and activated carbon sprayed on current collector electrode | Electrospinning Mixed slurry of polyquinoline and activated carbon sprayed on current collector electrode |
| Specific volume (F/g) | 162 | 105 | 98 | 102 |

|  | Example 5 | Example 6 | Comparative Example 1 | Comparative Example 2 |
|---|---|---|---|---|
| Conductive polymer | Polypyridine solution | Polyquinoxaline solution | None | Polyaniline dispersion |
| Carbon | Activated carbon | Activated carbon | Activated carbon slurry | Activated carbon powder |
| Electrode (A) preparation method | Electrospinning Mixed slurry of polypyridine solution and activated carbon sprayed on current collector electrode | Electrospinning Mixed slurry of polyquinoxaline and activated carbon sprayed on current collector electrode | Electrospinning Activated carbon slurry sprayed on current collector electrode | Press forming Polyaniline dispersion, activated carbon powder and Ketjen Black mixed, then press formed |
| Specific volume (F/g) | 105 | 97 | 95 | 68 |

TABLE I-continued

|  | Comparative Example 3 | Comparative Example 4 | Comparative Example 5 | Comparative Example 6 | Comparative Example 7 |
|---|---|---|---|---|---|
| Conductive polymer | Polypyrrole dispersion | Polyindole solution | Polyquinoline solution | Polypyridine solution | Polyquinoxaline solution |
| Carbon | Activated carbon powder | Activated carbon powder | Activated carbon powder | Activated carbon powder | Activated carbon powder |
| Electrode (A) preparation method | Press forming Polypyrrole dispersion, activated carbon powder and Ketjen Black mixed, then press formed | Press forming Polyindole solution, activated carbon powder and carbon black mixed and press formed | Press forming Polyquinoline solution, activated carbon powder and carbon black mixed and press formed | Press forming Polypyridine solution, activated carbon powder and carbon black mixed and press formed | Press forming Polyquinoxaline solution, activated carbon powder and Ketjen Black mixed, then press formed |
| Specific volume (F/g) | 42 | 45 | 48 | 45 | 47 |

In Examples 7 and 8 and Comparative Example 8, the same method as in Examples 1 to 6 and Comparative Example 1 was used to prepare a laminate composed of a conductive polymer fiber and an activated carbon fiber on a current collector electrode, except that, in the electrospinning apparatus shown in FIG. 1, the current collector electrode was made carbon paper having a size of 10×10 cm, instead of aluminum. The electrode composed of the formed laminate and the current collector electrode was punched out into a 10 mm diameter and used as the electrode (A). Further, 45 g of activated carbon powder having a specific surface area of 2000 m²/g and an average particle size of 8 μm, 5 g of conductive carbon black (made by Lion, Ketjen Black ECP600JD) and 5 g of polyvinylidene fluoride (made by Aldrich) using a ball mill, then 40 mg of the resultant mixed powder was taken, placed in a 10 mm diameter mold, then press molded at 15 MPa to obtain an electrode which was used as the electrode (B). The electrodes (A) and (B) were dried at 100° C. in vacuo for 6 hours, then placed facing each other across a polypropylene separator having a thickness of 80 μm and impregnated in vacuo with a 15% by weight aqueous sulfuric acid solution to fabricate an electric double layer capacitor. This electric double layer capacitor was measured for charging and discharging by a constant current of 300 mA/g per weight of electrode active substance using a charging/discharging tester (Hokuto Denko HJ1001SM8A). The specific capacity was determined from the discharge curve.

In Comparative Examples 9 and 10, the same method as in Examples 7 and 8 and Comparative Example 8 was used to prepare an electric double layer capacitor and determined the specific capacity per electrode active substance, except that, instead of an electrode formed by the electrospinning method, an electrode pressed formed into a 10 mm diameter shape by the same method as in Comparative Example 2 and Comparative Example 6 was used as the electrode (A). The obtained specific capacities are shown together in Table II.

TABLE II

|  | Example 7 | Example 8 | Comparative Example 8 | Comparative Example 9 | Comparative Example 10 |
|---|---|---|---|---|---|
| Conductive polymer | Polyaniline dispersion | Polypyridine solution | None | Polyaniline dispersion | Polypyridine solution |
| Carbon | Activated carbon | Activated carbon | Activated carbon slurry | Activated carbon powder | Activated carbon powder |
| Electrode(A) preparation method | Electrospinning Mixed slurry of polyaniline and activated carbon sprayed on current collector electrode | Electrospinning Mixed slurry of polypyrrole and activated carbon sprayed on current collector electrode | Electrospinning Activated carbon slurry sprayed on current collector electrode | Press forming Polyaniline dispersion, activated carbon powder and Ketjen Black mixed, then press formed | Press forming Polypyridine solution, activated carbon powder and carbon black mixed and press formed |
| Specific volume (F/g) | 223 | 147 | 118 | 84 | 63 |

INDUSTRIAL APPLICABILITY

An electrode obtained by stacking fibrile like carbon-based fiber and conductive polymer fiber in a net shape on a current collector electrode by the electrospinning method according to the present invention has a larger specific surface area than a conventional capacitor electrode and a high capacity therefore is extremely high in practicality.

The invention claimed is:

1. An electrode for an electric double layer capacitor comprising a current collector electrode and an active substance carried on the current collector electrode, said active substance being composed of a carbon-based fiber and a conductive polymer fiber formed from a dispersion of a porous carbon material and a conductive polymer, dispersed in water and/or an organic solvent by an electrospinning method.

2. An electrode for an electric double layer capacitor as claimed in claim 1, wherein said conductive polymer is a conductive polymer having a nitrogen atom.

3. An electrode for an electric double layer capacitor as claimed in claim 2, wherein said conductive polymer is selected from the group consisting of polyaniline, polypyrrole, polyindole, polyquinoline, polyisoquinoline, polypyridine, polyquinoxaline and their derivatives.

4. An electrode for an electric double layer capacitor as claimed in claim 2, wherein said conductive polymer is stably dispersed in an organic solvent and is obtained by oxidative polymerization of a sulfonic acid and a polyaniline or its derivative in a mixed layer composed of an aqueous layer and an organic layer in the presence of a molecular weight adjuster.

5. An electric double layer capacitor comprising an electrode for an electric double layer capacitor according to claim 4.

6. An electrode for an electric double layer capacitor as claimed in claim 3, wherein said conductive polymer is stably dispersed in an organic solvent and is obtained by oxidative polymerization of a sulfonic acid and a polyaniline or its derivative in a mixed layer composed of an aqueous layer and an organic layer in the presence of a molecular weight adjuster.

7. An electric double layer capacitor comprising an electrode for an electric double layer capacitor according to claim 6.

8. An electrode for an electric double layer capacitor according to claim 6, wherein said oxidation polymerization is carried out further in the presence of an interphase transfer catalyst.

9. An electric double layer capacitor comprising an electrode for an electric double layer capacitor according to claim 3.

10. An electric double layer capacitor comprising an electrode for an electric double layer capacitor according to claim 2.

11. An electrode for an electric double layer capacitor as claimed in claim 1, wherein said conductive polymer is selected from the group consisting of polyaniline, polypyrrole, polyindole, polyquinoline, polyisoquinoline, polypyridine, polyquinoxaline and their derivatives.

12. An electrode for an electric double layer capacitor as claimed in claim 11, wherein said conductive polymer is stably dispersed in an organic solvent and is obtained by oxidative polymerization of a sulfonic acid and a polyaniline or its derivative in a mixed layer composed of an aqueous layer and an organic layer in the presence of a molecular weight adjuster.

13. An electric double layer capacitor comprising an electrode for an electric double layer capacitor according to claim 12.

14. An electrode for an electric double layer capacitor according to claim 12, wherein said oxidation polymerization is carried out further in the presence of an interphase transfer catalyst.

15. An electric double layer capacitor comprising an electrode for an electric double layer capacitor according to claim 11.

16. An electrode for an electric double layer capacitor as claimed in claim 1, wherein said conductive polymer is stably dispersed in an organic solvent and is obtained by oxidative polymerization of a sulfonic acid and a polyaniline or its derivative in a mixed layer composed of an aqueous layer and an organic layer in the presence of a molecular weight adjuster.

17. An electric double layer capacitor comprising an electrode for an electric double layer capacitor according to claim 16.

18. An electrode for an electric double layer capacitor according to claim 16, wherein said oxidation polymerization is carried out further in the presence of an interphase transfer catalyst.

19. An electric double layer capacitor comprising an electrode for an electric double layer capacitor according to claim 1.

* * * * *